United States Patent
Hsu et al.

(10) Patent No.: US 6,834,089 B2
(45) Date of Patent: Dec. 21, 2004

(54) DEVICE FOR COMPUTING TANGENT ANGLES AND ASSOCIATED DQPSK DECODER

(75) Inventors: Terng-Yin Hsu, Yun-Lin (TW); Chen-Yi Lee, Hsinchu (TW); Fan-Ming Kuo, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 847 days.

(21) Appl. No.: 09/818,454

(22) Filed: Mar. 27, 2001

(65) Prior Publication Data

US 2002/0122506 A1 Sep. 5, 2002

(30) Foreign Application Priority Data

Mar. 2, 2001 (TW) ........................... 90203104 U

(51) Int. Cl.⁷ ..................... H03D 3/22; H04L 27/22
(52) U.S. Cl. .................. 375/331; 375/330; 375/329; 375/283

(58) Field of Search .............................. 375/330, 331, 375/283, 329; 329/304, 310

(56) References Cited

U.S. PATENT DOCUMENTS

| | | | |
|---|---|---|---|
| 3,991,377 A | * 11/1976 | Salazar et al. | 329/304 |
| 4,896,336 A | * 1/1990 | Henely et al. | 375/324 |
| 4,922,206 A | * 5/1990 | Nicholas | 329/304 |
| 5,379,323 A | * 1/1995 | Nakaya | 375/331 |
| 5,943,370 A | * 8/1999 | Smith | 375/334 |
| 6,055,281 A | * 4/2000 | Hendrickson et al. | 375/329 |
| 6,075,827 A | * 6/2000 | Shida et al. | 375/331 |
| 2001/0031024 A1 | * 10/2001 | Petersen et al. | 375/335 |

* cited by examiner

Primary Examiner—Phoung Phu
(74) Attorney, Agent, or Firm—J.C. Patents

(57) ABSTRACT

A tangent angle computation device and associated DQPSK decoder. The computation device uses an eight-bit divider and a four-quadrant technique for finding a quantized angular value from an incoming signal. The quantized angular value is subsequently used to decode the incoming signal.

4 Claims, 1 Drawing Sheet

DEVICE FOR COMPUTING TANGENT ANGLES AND ASSOCIATED DQPSK DECODER

CROSS-REFERENCE TO RELATED APPLICATION

This application claims the priority benefit of Taiwan application serial no. 90203104, filed Mar. 3, 2001.

BACKGROUND OF THE INVENTION

1. Field of Invention

The present invention relates to a quadrant phase shift keying (QPSK) decoder. More particularly, the present invention relates to a device for computing tangent angles and an associated differential-encoding quadrant phase shift keying (DQPSK) decoder.

2. Description of Related Art

A conventional cable-connected transmissions system is low in mobility and short in communication distance. Therefore, many types of wireless communication techniques have been developed. Amongst wireless transmission systems, the most common one is the spread spectrum technique for transmitting voice or images. To eliminate as much interference as possible, a pseudo-noise sequence (PN) is often added to the system. Such spread spectrum techniques can be classified into two major types; namely, the frequency-hopping spread spectrum (FHSS) technique and the direct-sequence spread spectrum (DSSS) technique.

The advantages of employing the DSSS techniques in a wireless communication system include data privacy, flexibility comparison rules for the system (a soft-limited system), anti-jamming and fading rejection. However, a chip using the DSSS technique requires a large number of logic gates. Hence, a large section of the chip needs to be set aside for housing the logic gates and the chip tends to consume a large amount of energy. To resolve these problems, a digital receiver having a differential-encoding quadrant phase shift keying (DQPSK) device to serve as encoder and decoder and a matched filter using low-power pointer access memory (PAM) is used. Although such an additional component may attenuate the power consumption of the chip and area requirement in a chip slightly, the digital receiver also uses a decode/encoder having a coordinate system divided into eight quadrants. Therefore, operations demanded by the DSSS digital receiver are quite complicated. Such complications cancel out most of the advantages obtained by having fewer logic gates and lower power consumption.

SUMMARY OF THE INVENTION

Accordingly, one object of the present invention is to provide a device for computing tangent angles and associated differential-encoding quadrant phase shift keying (DQPSK) decoder such that the degree of complexity in operation is greatly reduced.

To achieve these and other advantages and in accordance with the purpose of the invention, as embodied and broadly described herein, the invention provides a device for computing tangent angles. The tangent computing device includes a signal input terminal, a direct current input terminal, a plurality of subtractors, a plurality of comparators, a plurality of multiplexers, an eight-bit divider, a shift encoder, an XOR logic gate and an angle-computing device. The signal-input terminal includes a real part coefficient and an imaginary part coefficient for representing a complex number signal. The direct current input terminal receives a direct current signal. The positive input terminal of a first real part subtractor receives the direct current signal and the negative input terminal of the first real part subtractor receives the real coefficient. The subtraction result is output from the output terminal of the first real part subtractor. Similarly, the negative input terminal of a second real part subtractor receives the direct current signal and the positive input terminal of the second real part subtractor receives the real coefficient. The subtraction result is output from the output terminal of the second real part subtractor. The positive input terminal of a first imaginary part subtractor receives the direct current signal and the negative input terminal of the first imaginary part subtractor receives the imaginary coefficient. The subtraction result is output from the output terminal of the first imaginary part subtractor. Similarly, the negative input terminal of a second imaginary subtractor receives the direct current signal and the positive input terminal of the second imaginary part subtractor receives the imaginary coefficient. The subtraction result is output from the output terminal of the second imaginary part subtractor. A first comparator compares the direct current signal and the real part coefficient and outputs a real part label. A second comparator compares the direct current signal and the imaginary part coefficient and outputs an imaginary part label. A first multiplexer outputs an absolute real part value of the data from the first real part subtractor or the absolute value of the data from the second real part subtractor according to the real part label. Similarly, a second multiplexer outputs an absolute imaginary part value of the data from the first imaginary part subtractor or the absolute value of the data from the second imaginary part subtractor according to the imaginary part label. The XOR logic gate receives the real part label and the imaginary part label and outputs a logically XORed result. A third multiplexer receives the absolute real part value and the absolute imaginary part value. The third multiplexer outputs the absolute real part value or the absolute imaginary part value as a horizontal axis value according to the result produced by the XOR logic gate. A fourth multiplexer also receives the absolute imaginary part value and the absolute real part value. The fourth multiplexer outputs the absolute real part value or the absolute imaginary part value as a vertical axis value according to the result produced by the XOR logic gate. The eight-bit divider produces a tangent value by dividing the vertical axis value by the horizontal axis value. The shift encoder produces a set of shift-encoded signals according to the real part label and the imaginary part label. The angle-computing device produces quantized angular values according to the tangent value and the shift-encoded groups.

This invention also provides a DQPSK decoder to be used in conjunction with a tangent computation device. The DQPSK decoder receives the quantized angular value from the aforementioned angle-computing device and performs a decoding of the complicated signals from the DSSS receiver according to the quantized angular value.

In this invention, an eight-bit divider is used inside the tangent computation device. This reduces the degree of complexity in computation for a given degree of accuracy. Furthermore, the deployment of an encoder with four-quadrant encoding simplifies the encoding procedure considerably when compared with the conventional eight-quadrant encoding technique.

It is to be understood that both the foregoing general description and the following detailed description are exemplary, and are intended to provide further explanation of the invention as claimed.

BRIEF DESCRIPTION OF THE DRAWINGS

The accompanying drawing is included to provide a further understanding of the invention, and is incorporated in and constitutes a part of this specification. The drawing illustrates embodiments of the invention and, together with the description, serves to explain the principles of the invention. In the drawing.

DESCRIPTION OF THE PREFERRED EMBODIMENTS

Figure 1:
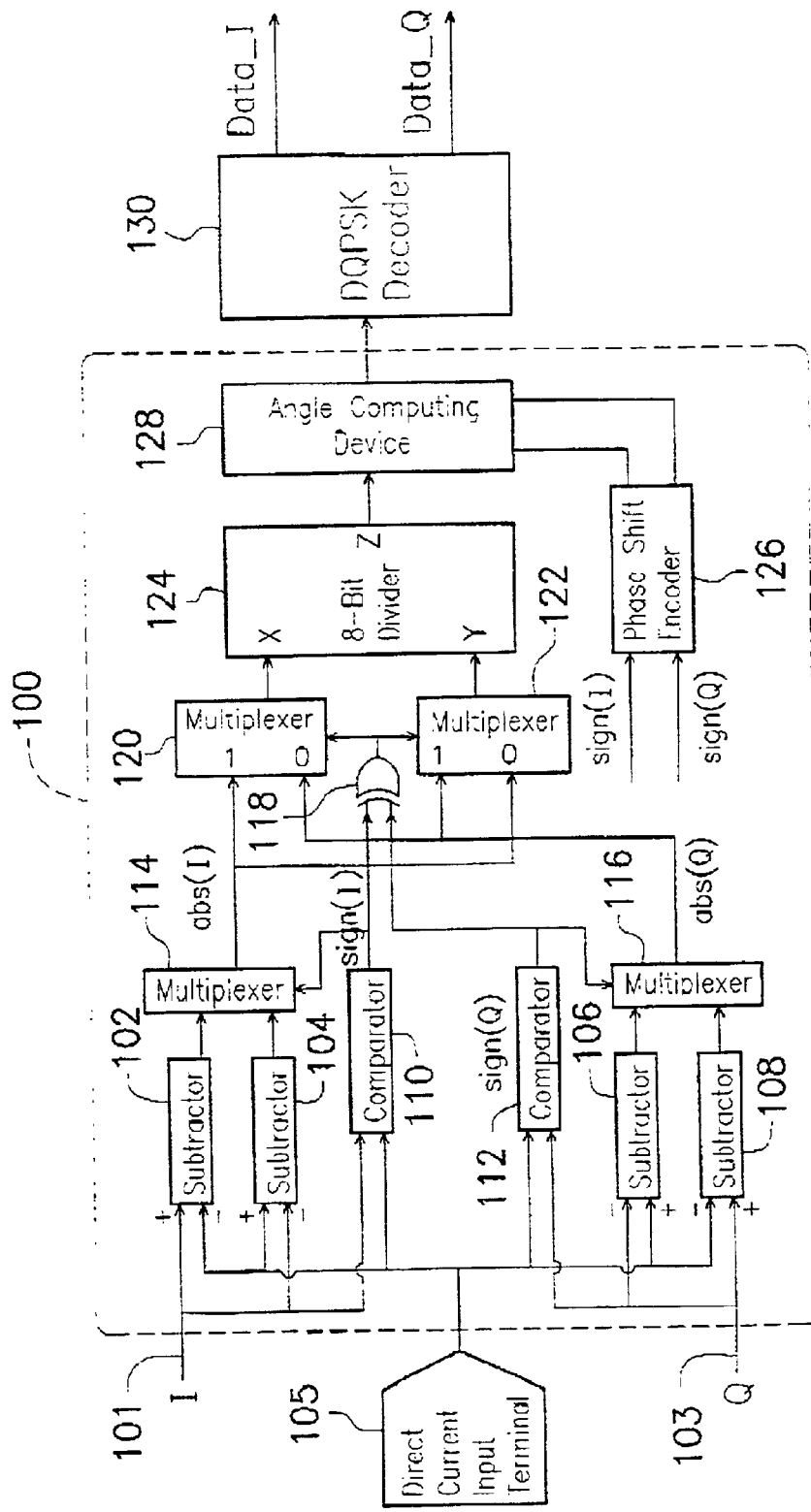
FIG. 1 is a block diagram showing the components of a differential-encoding quadrant phase shift keying (DQPSK) decoding system according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram showing the components of a differential-encoding quadrant phase shift keying (DQPSK) decoding system according to one preferred embodiment of this invention. As shown in FIG. 1, the DQPSK decoding system includes a tangent computation device 100 and a DQPSK decoder 130. The tangent computation device 100 further includes four subtractors 102, 104, 106 and 108, two comparators 110 and 112, four multiplexers 114, 116, 120 and 122, an XOR logic gate 118, an eight-bit divider 124, a shift encoder 126 and an angle-computing device 128.

The tangent computation device 100 has altogether three terminals including a direct current signal input terminal 105, a terminal 101 for inputting the real part coefficient of a complex signal and a terminal 103 for inputting the imaginary part coefficient of the complex signal. In this embodiment, the real part coefficient I is fed into the tangent computation device 100 via the input terminal 101 while the imaginary part coefficient Q is fed into the tangent computation device 100 via the input terminal 103. Inside the tangent computation device 100, the real part signal I is re-directed to the positive terminal of the subtractor 102 and the negative terminal of the subtractor 104, respectively. Similarly, the imaginary part signal Q is re-directed to the positive terminal of the subtractor 106 and the negative terminal of the subtractor 108, respectively. In addition, direct current signal fed to the direct current terminal 105 is re-directed to the negative terminal of the subtractors 102 and 108 and the positive terminal of the subtractors 104 and 106, respectively.

The multiplexer 114 outputs an absolute real part value abs(I) of the data either from the subtractor 102 or from the subtractor 104 according to the output of the comparator 110. Similarly, the multiplexer 116 outputs an absolute imaginary part value abs(Q) of the data either from the subtractor 106 or from the subtractor 108 according to the output of the comparator 112. The comparator 110 compares the direct current input from the direct current input terminal 105 and the real part coefficient I and outputs a real part label for indicating the polarity of the real part coefficient I. The comparator 112 compares the direct current input from the direct current input terminal 105 and the imaginary part coefficient Q and outputs an imaginary part label for indicating the polarity of the imaginary part coefficient I. Hence, based on the real part label and the imaginary part label, the multiplexers 114 and 116 are able to output absolute real part coefficient I and absolute imaginary coefficient Q from the pair of subtractors 102 and 104 and the pair of subtractors 106 and 108, respectively.

The absolute real part coefficient I and the absolute imaginary part coefficient Q are sent to the eight-bit divider 124 via the multiplexers 120 and 122 as horizontal axis value and vertical axis value. To decide the respective multiplexer for outputting horizontal and vertical axis value, an XOR logic operation of the real part label (sign(I)) and the imaginary part label (sign(Q)) is conducted through the XOR logic gate 118. According to the horizontal axis value and vertical axis value, the 8-bit divider 124 produces a tangent value by dividing the vertical axis value by the horizontal axis value. The tangent value is transmitted to the angle-computing device 128. In this embodiment, the tangent value is quantized into an angular value using a lookup table having 8-bit accuracy. The quantized angular value is stored as a phase bit series with five bits representing phase value and two bits representing phase shift. For example, for a phase bit series=XX10110, XX indicates the phase shift value while 10110 is the phase value after angular quantization. In other words, when $\theta = \tan^{-1}(Q/I) + $phase shift value, $\tan^{-1}(Q/I)$ is the angular quantization while $\theta$ is the phase value. Furthermore, $\theta = \tan^{-1}(Q/I) = \tan^{-1}(Y/X)$ so that the values of (X, Y) are (I, Q) when IQ>0 and are (Q, I) when IQ<0. In addition, the method of calculating the phase shift value is as follows:

if label '0' represents positive and label '1' represents negative, and if the real part label and the imaginary part label are both '0', the phase shift value={sign(I), sign(Q)}90°={0,0}90°=00;

if the real part label is '1' and the imaginary part label is '0', the phase shift value={sign(I), sign(Q)}90°={1,0}90°=01;

if the real part label is '0' and the imaginary part label is '1', the phase shift value={sign(I), sign(Q)}90°={0,1}90°=10; and if the real part label and the imaginary part label are both '1', the phase shift value={sign(I), sign(Q)}90°={1,1}90°=11.

Hence, this invention can use four quadrants to obtain a corresponding angular quantization through the tangent value, thereby simplifying computational operations.

After obtaining a quantized value from the angle-computing device 128, the quantized angular value is sent to the DQPSK decoder 130. According to the quantization value, complex signal received by the DSSS receiver can be decoded inside the DQPSK decoder 130. Ultimately, the required data is obtained.

In conclusion, one major aspect of this invention is the utilization of an 8-bit divider for reducing computational complexity and operation time. Furthermore, angular quantization is achieved through four quadrants instead of the conventional eight quadrants. Therefore, degree of complexity of logical computation within the device is further simplified.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computation device for finding tangent angles, comprising:
    a signal input terminal for inputting a complex signal that includes a real part coefficient and an imaginary part coefficient;

a direct current input terminal for inputting a direct current signal;

a first real part subtractor having a positive input terminal, a negative input terminal and an output terminal, wherein a direct current signal is fed to the positive input terminal of the first real part subtractor, the real part coefficient is fed to the negative input terminal of the first real part subtractor, and subtraction result is output from the output terminal of the first real part subtractor;

a second real part subtractor having a positive input terminal, a negative input terminal and an output terminal, wherein the direct current signal is fed to the negative input terminal of the second real part subtractor, the real part coefficient is fed to the positive input terminal of the second real part subtractor, and the subtraction result is output from the output terminal of the second real part subtractor;

a first imaginary part subtractor having a positive input terminal, a negative input terminal and an output terminal, wherein the direct current signal is fed to the positive terminal of the first imaginary part subtractor, the imaginary part coefficient is fed to the negative terminal of the first imaginary part subtractor, and the subtraction result is output from the output terminal of the first imaginary part subtractor;

a second imaginary part subtractor having a positive input terminal, a negative input terminal and an output terminal, wherein the direct current signal is fed to the negative terminal of the second imaginary part subtractor, the imaginary part coefficient is fed to the positive terminal of the second imaginary part subtractor, and a subtraction result is output from the output terminal of the second imaginary part subtractor;

a first comparator for comparing the direct current signal and the real part coefficient to produce a real part label;

a second comparator for comparing the direct current signal and the imaginary part coefficient to produce an imaginary part label;

a first multiplexer for selecting data either from the output terminal of the first real part subtractor or from the output terminal of the second real part subtractor according to the real part label and outputting an absolute real part value;

a second multiplexer for selecting data either from the output terminal of the first imaginary part subtractor or from the output terminal of the second imaginary part subtractor according to the imaginary part label and outputting an absolute imaginary part value;

an XOR logic gate for receiving the real part label and the imaginary part label and outputting an XORed logic output;

a third multiplexer having a first input terminal for receiving the absolute real part value, a second input terminal for receiving the absolute imaginary part value and an output terminal for outputting the absolute real part value or the absolute imaginary part value to serve as a horizontal axis value according to a result of XOR computation;

a fourth multiplexer having a first input terminal for receiving the absolute imaginary part value, a second input terminal for receiving the absolute real part value and an output terminal for outputting the absolute imaginary part value or the absolute real part value to serve as a vertical axis value according to the result of XOR computation;

an eight-bit divider for finding a tangent value by dividing the vertical axis value by the horizontal axis value;

a shift encoder for generating a set of shift-encoded codes according to the real part label and the imaginary part label; and an angle-computing device for finding a quantization value according to the tangent value and the shift-encoded codes.

2. The computation device of claim 1, wherein a quantized value obtained from the angle-computing device includes a five-bit length phase value and a two-bit length phase shift value.

3. A differential-encoding quadrant phase shift keying (DQPSK) system, comprising:

a tangent angle computation device having:

a direct current input terminal for inputting a direct current signal;

a first real part subtractor having a positive input terminal, a negative input terminal and an output terminal, wherein the direct current signal is fed to the positive input terminal of the first real part subtractor, a real part coefficient is fed to the negative input terminal of the first real part subtractor, and a subtraction result is output from the output terminal of the first real part subtractor;

a second real part subtractor having a positive input terminal, a negative input terminal and an output terminal, wherein the direct current signal is fed to the negative input terminal of the second real part subtractor, the real part coefficient is fed to the positive input terminal of the second real part subtractor, and a subtraction result is output from the output terminal of the second real part subtractor;

a first imaginary part subtractor having a positive input terminal, a negative input terminal and an output terminal, wherein the direct current signal is fed to the positive terminal of the first imaginary part subtractor, an imaginary part coefficient is fed to the negative terminal of the first imaginary part subtractor, and a subtraction result is output from the output terminal of the first imaginary part subtractor;

a second imaginary part subtractor having a positive input terminal, a negative input terminal and an output terminal, wherein the direct current signal is fed to the negative input terminal of the second imaginary part subtractor, the imaginary part coefficient is fed to the positive input terminal of the second imaginary part subtractor, and a subtraction result is output from the output terminal of the second imaginary part subtractor;

a first comparator for comparing the direct current signal and the real part coefficient to produce a real part label;

a second comparator for comparing the direct current signal and the imaginary part coefficient to produce an imaginary part label;

a first multiplexer for selecting data either from the output terminal of the first real part subtractor or from the output terminal of the second real part subtractor according to the real part label and outputting an absolute real part value;

a second multiplexer for selecting data either from the output terminal of the first imaginary part subtractor or from the output terminal of the second imaginary part subtractor according to the imaginary part label and outputting an absolute imaginary part value;

an XOR logic gate for receiving the real part label and the imaginary part label and outputting an XORed logic output;

a third multiplexer having a first input terminal for receiving the absolute real part value, a second input terminal for receiving the absolute imaginary part value and an output terminal for outputting the absolute real part value or the absolute imaginary part value to serve as a horizontal axis value according to a result of XOR computation;

a fourth multiplexer having a first input terminal for receiving the absolute imaginary part value, a second input terminal for receiving the absolute real part value and an output terminal for outputting the absolute imaginary part value or the absolute real part value to serve as a vertical axis value according to the result of XOR computation;

an eight-bit divider for finding a tangent value by dividing the vertical axis value by the horizontal axis value;

a shift encoder for generating a set of shift-encoded codes according to the real part label and the imaginary part label;

an angle-computing device for finding a quantization value according to the tangent value and the shift-encoded codes;

and a DQPSK decoder for receiving the quantized angle and decoding the complex signal according to a quantized value.

4. The DQPSK decoding system of claim 3, wherein the quantized value obtained from the angle-computing device includes a five-bit length phase value and a two-bit length phase shift value.

* * * * *